United States Patent
Zajac et al.

(10) Patent No.: US 10,176,411 B2
(45) Date of Patent: Jan. 8, 2019

(54) SINGLE-PASS IMAGING AND OPTICAL MARK RECOGNITION SCANNING

(71) Applicant: Scantron Corporation, Eagan, MN (US)

(72) Inventors: Joe Zajac, Cypress, CA (US); Jonathan Ort, Prior Lake, MN (US)

(73) Assignee: Scantron Corporation, Eagan, MN (US)

( * ) Notice: Subject to any disclaimer, the term of this patent is extended or adjusted under 35 U.S.C. 154(b) by 114 days.

(21) Appl. No.: 15/165,401

(22) Filed: May 26, 2016

(65) Prior Publication Data
US 2017/0344863 A1  Nov. 30, 2017

(51) Int. Cl.
*G06K 9/00* (2006.01)
*G06K 17/00* (2006.01)
*G06K 9/18* (2006.01)
*G06K 9/20* (2006.01)

(52) U.S. Cl.
CPC ..... *G06K 17/0032* (2013.01); *G06K 9/00442* (2013.01); *G06K 9/18* (2013.01); *G06K 9/2018* (2013.01)

(58) Field of Classification Search
CPC .. G06K 17/0032; G06K 9/00442; H04N 1/04; H04N 1/02815; H04N 1/00328; H04N 2201/0039; H04N 2201/0081
USPC ............ 235/470; 382/100, 175, 181, 313
See application file for complete search history.

(56) References Cited

U.S. PATENT DOCUMENTS

| | | | | |
|---|---|---|---|---|
| 4,047,023 A * | 9/1977 | Key | ............... | G06K 7/10851 235/455 |
| 4,603,976 A * | 8/1986 | Fetzer | ............... | G06K 7/12 235/455 |
| 5,134,669 A * | 7/1992 | Keogh | ............... | G06F 17/243 250/271 |
| 5,184,003 A * | 2/1993 | McMillin | ............... | G06K 17/0032 235/454 |
| 5,416,308 A * | 5/1995 | Hood | ............... | G06K 9/2054 235/454 |
| 5,452,379 A * | 9/1995 | Poor | ............... | G09B 7/066 235/454 |
| 5,672,060 A * | 9/1997 | Poor | ............... | G09B 7/02 382/321 |
| 6,459,509 B1 * | 10/2002 | Maciey | ............... | H04N 1/12 358/406 |
| 7,573,616 B2 * | 8/2009 | Poor | ............... | G06K 7/12 235/456 |
| 9,800,753 B1 * | 10/2017 | Zajac | ............... | H04N 1/04 |
| 2005/0213110 A1 * | 9/2005 | Ochiai | ............... | G01J 3/50 356/616 |

(Continued)

*Primary Examiner* — Samir A Ahmed
(74) *Attorney, Agent, or Firm* — Fish & Richardson P.C.

(57) ABSTRACT

Performing optical mark recognition (OMR) scanning includes receiving a substrate to be scanned, the substrate having one or more colors visible to a human eye and bearing user-made marks; moving the substrate and a light sensor relative to each other such that the substrate moves past the light sensor a single time; during the relative movement of the substrate, scanning the substrate using multiple colors of light to simultaneously generate both (a) image data representing a visual appearance of the substrate, and (b) OMR data corresponding to respective locations of the user-made marks on the substrate.

31 Claims, 5 Drawing Sheets

(56) References Cited

U.S. PATENT DOCUMENTS

2005/0238260 A1* 10/2005 Coleman ............ H04N 1/00326
382/313

* cited by examiner

SINGLE-PASS IMAGING AND OPTICAL MARK RECOGNITION SCANNING

TECHNICAL FIELD

This disclosure relates to scanning documents, e.g., performing optical mark recognition (OMR) on a test form or the like that has been marked on using a writing instrument (e.g. pen, pencil).

BACKGROUND

Optical mark recognition (OMR), also referred to as optical mark reading, is the process of capturing human-marked data from document forms such as surveys, tests, or other substrates bearing markings. One of the most familiar applications of optical mark recognition is the use of #2 pencil (HB in Europe) bubble optical answer sheets in multiple choice question examinations. Students mark their answers, or other personal information, by darkening circles marked on a pre-printed sheet. Afterwards the sheet is automatically graded by a scanning machine.

Many traditional OMR devices work with a dedicated scanner device that shines a beam of light onto the form paper. The contrasting reflectivity at predetermined positions on a page is then used to detect these marked areas because they reflect less light than the blank areas of the paper.

Figure 1:
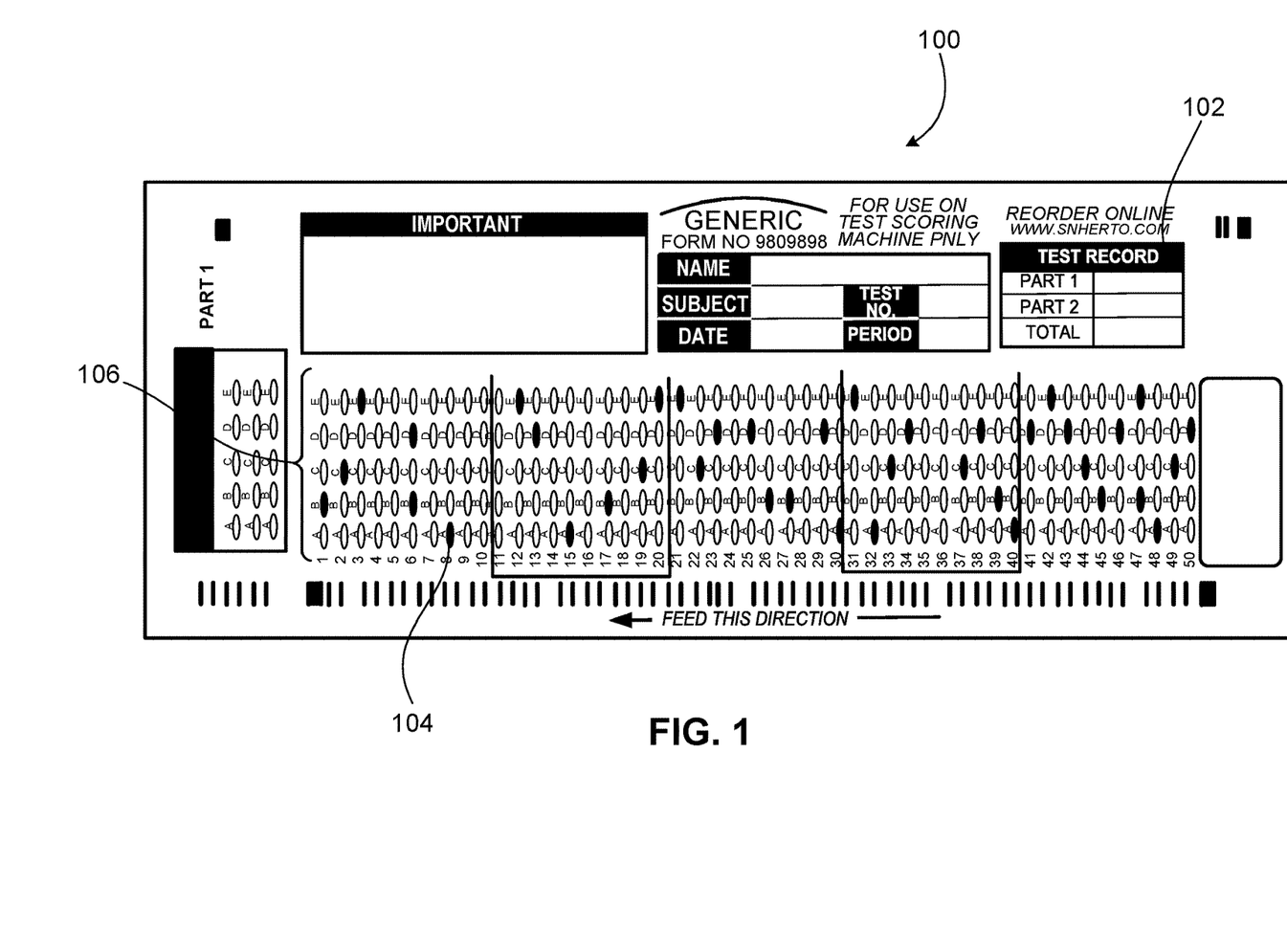
FIG. 1 illustrates an example of an optical mark recognition test form.

FIG. 1 shows an example of a test form 100 that may be used with OMR. The form 100 typically is a sheet of paper having various markings such areas 102, which can take on various colors such as red, blue, orange, green, black, or grey, and multiple choice answer receiving areas 106, each area having a label A, B, C, D, or E. The example form shown in FIG. 1 has 250 answer receiving areas formed as a matrix having 50 rows, with five answer receiving areas 106 per row. While taking a test, the test taker uses a writing instrument to make a mark, such as oval 104, in one of the desired answer receiving areas 106 corresponding to which answer (A, B, C, D, or E) the test taker believes is correct. Once completed, the form 100 is handed in to the test proctor and it is run through an OMR scanner, which reads the positions of the markings and compares them to a predetermined set of correct answers. In this manner, the test taker's test form 100 is graded.

Figure 2:
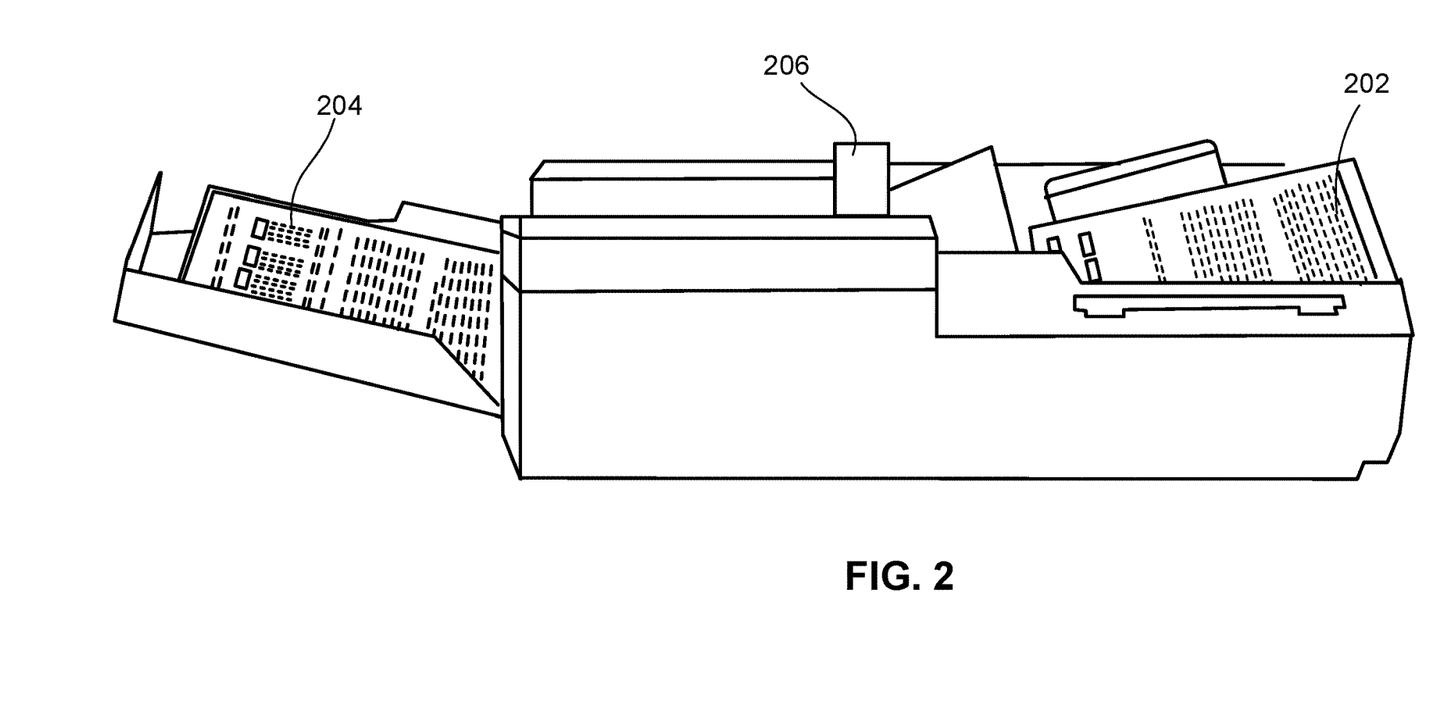
FIG. 2 illustrates an example of an optical mark recognition scanner.

FIG. 2 shows an example of a typical OMR scanner 200 having a form input tray 202, a form output tray 204, and a scanning head 206. The scanner 200 pulls one form at a time from the input tray 202 and runs it through the scanner pathway, and activating the scanning head 206 to scan for the presence and location of marks on the form. The presence of non-marked images on the form (e.g. background form marking) is not desirable to collect the OMR marks and ideally should be removed at scan-time. One technique to doing this is the use of Infrared (IR) light and marking the test with a graphite-based pencil. The scanner head 206 accomplishes this task by illuminating the form with infrared (IR) light, which causes the graphite-based pencil markings to appear opaque to the OMR sensor, while all other areas on the form (i.e., those areas not bearing graphite-based markings) are transparent to the sensor.

SUMMARY

This disclosure relates to scanning forms, e.g., performing optical mark recognition (OMR) on a test form or the like that has been marked on using a writing instrument.

In an exemplary implementation, a method of performing optical mark recognition (OMR) scanning, or a system configured to perform same, includes receiving a substrate to be scanned, the substrate having one or more colors visible to a human eye and bearing user-made marks; moving the substrate and a light sensor relative to each other such that the substrate moves past the light sensor a single time; during the relative movement of the substrate and the light sensor, scanning the substrate using multiple colors of light to simultaneously generate both (a) image data representing a visual appearance of the substrate, and (b) OMR data corresponding to respective locations of the user-made marks on the substrate.

The substrate may be scanned using up to four colors of light, one of which is infrared light, upon a determination that the substrate is to be scanned in a manner corresponding to graphite-based user-made marks.

The substrate may be scanned using multiple colors of light upon a determination that the substrate is to be scanned in a manner corresponding to non-graphite-based user-made marks.

OMR data may be generated based on one of the three colors of light using color-drop technology. For example, if the background information on a form is printed in Green and marks are made with a Black pen, OMR data could be collected by using only Green light, hence dropping out all green background, non-mark information.

The method may further include transmitting the OMR data and the image data to a separate computer system before receiving a subsequent substrate to be scanned. Transmitting the OMR data and the image data may include transmitting to a computer system that is external to a device that performs the scanning.

The method may further include simultaneously performing the scanning of both sides of the substrate using a first light sensor for a first side of the substrate, and a second light sensor for a second side of the substrate; and generating a first set of OMR data and image data based on output of the first light sensor, and a second set of OMR data and image data based on output of the second light sensor.

The one or more colors visible to a human eye may include black or white or both.

The method may further include associating the OMR data and image data to form a test results file corresponding the scanned substrate.

Scanning the substrate may include iteratively illuminating the substrate with one or more of red, green, blue, or infrared light.

Scanning the substrate comprises illuminating the substrate with red, green, and blue light in sequence. Alternatively, scanning the substrate may include illuminating the substrate with red, green, blue, and infrared light in sequence.

Moving the substrate and the light sensor relative to each other may involve moving the substrate past a stationary sensor. Alternatively, or in addition, moving the substrate and the light sensor relative to each other may involve moving the light sensor past the substrate while the substrate is stationary.

In another exemplary implementation, a method of performing optical mark recognition (OMR) scanning, or a system therefor, includes (a) receiving a substrate to be scanned, the substrate having one or more colors visible to a human eye and bearing user-made marks; (b) determining whether the substrate is to be scanned in a manner corresponding to graphite-based user-made marks; (c) based on a result of the determining, either: (i) scanning the substrate using up to four colors of light including both (A) infrared light to generate OMR data representing respective locations of the user-made graphite marks on the substrate, and (B) three colors of light to generate image data representing a visual appearance of the substrate; or (ii) scanning the substrate using three colors of light to generate both (A) image data representing a visual appearance of the substrate, and (B) OMR data representing respective locations of the user-made marks on the substrate, wherein the OMR data is based on one of the three colors of light.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to scanning forms, e.g., performing optical mark recognition (OMR) on a test form or other substrate that has been marked on using a writing instrument.

The present inventors recognized that in certain situations, for example, high-stakes testing environments such as professional board exams or the like, disputes about whether an OMR scanner incorrectly graded a test form, e.g., by improperly detecting the absence or presence of a marking in an answer receiving area corresponding to a wrong answer, may have serious consequences for the test taker, especially when the margin between passing and failing the test rides on the correctness of a single answer. In such situations, typically the answer form in question is either re-scanned or visually inspected to determine whether in fact the OMR scanner detected a false positive or a false negative, thereby resulting in a grading error. The inventors recognized, however, that the answer form may change appearance between the time it was scanned and the time it is visually inspected or re-scanned. For example, after the scanning has occurred and the answer form is carried along the scanner's form pathway, the form may become smudged, scraped or otherwise altered in appearance such that an answer receiving area is darkened or lightened relative to the time of scanning. In such cases, any subsequent re-scanning or visual inspection may be incorrect as a result of the post-scanning alteration in appearance, thereby potentially resulting in incorrect grading of the answer form.

Accordingly, the present inventors recognized the importance, and attendant advantages, of capturing a digital image of the answer form at the same time as it is being OMR scanned. That way, any subsequent post-scanning alterations of the form will not affect the visual re-grading of the answer form. Rather, the digital image of the form as it appeared at the time of scanning can be consulted and used for re-grading purposes. In addition, both the test taker and the test giver are assured of the identity and appearance of the answer form that was scanned and assigned its corresponding grade. Moreover, a full color digital image is useful to serve as legal evidence of what the answer form that was actually OMR scanned looked like at the exact time of scanning.

Figure 3:
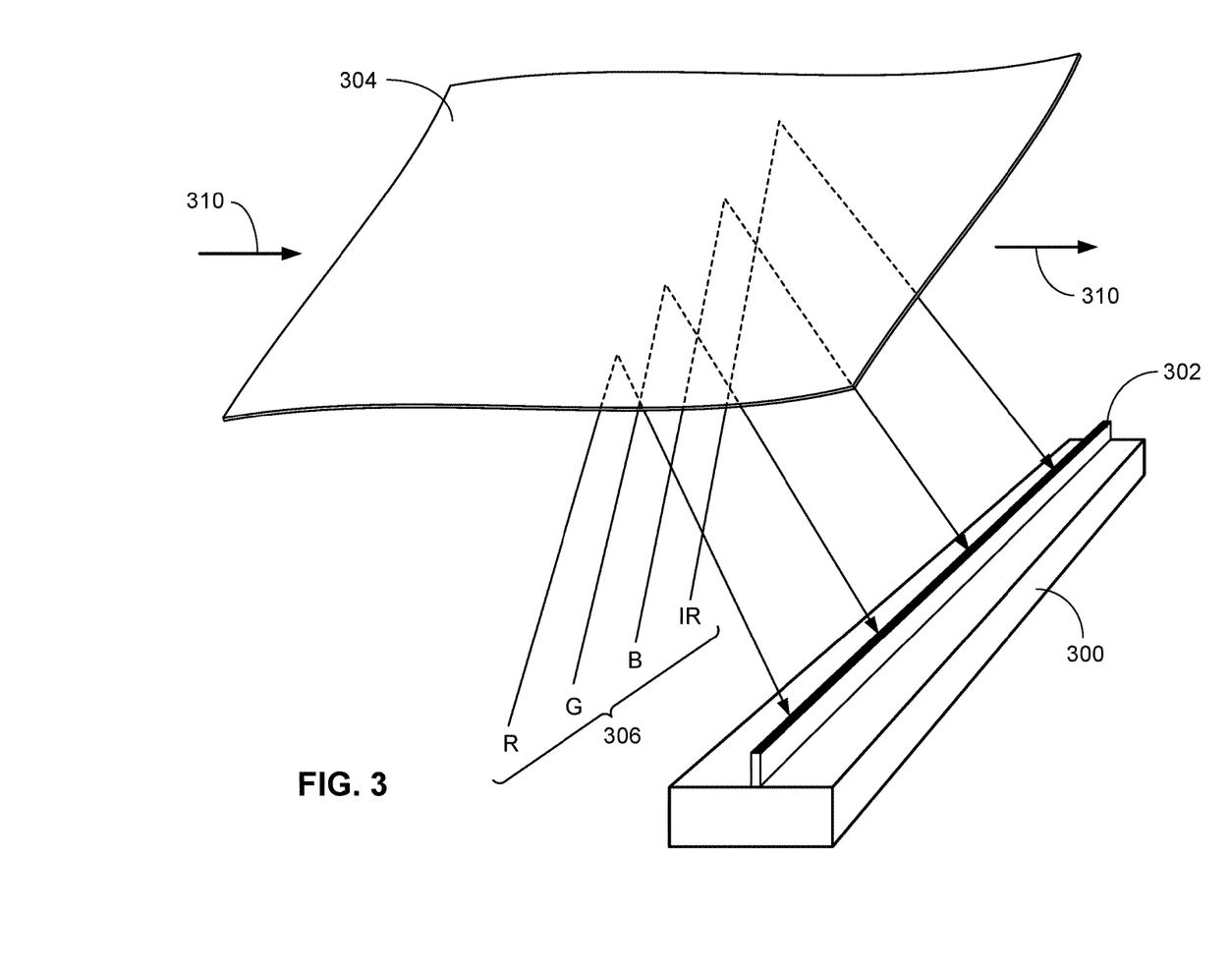
FIG. 3 illustrates scanning of a substrate by a four color scanner head.

FIG. 3 illustrates a conceptual representation of how to capture a digital image of a substrate (e.g., an answer form) at the same time as OMR scanning is performed on the substrate to detect the presence and location of user-made markings on the form, whether graphite-based or otherwise (e.g., ink). As used herein, capturing a digital image "at the same time" as OMR scanning is performed (equivalently, "simultaneously with the OMR scanning") means that both functions (i.e., generating OMR data and generating digital image data) are performed during a single pass over a single read head 300.

As shown in FIG. 3, as part of passing through the scanning path of the scanner, the substrate 304 is passed in the direction of arrows 310 over a light sensor 302, which forms part of the scanning head 300. Scanning of the substrate 304 occurs during a single pass in which the substrate 304 and the sensor 302 are moved relative to each other. In the example shown in FIG. 3, it is the substrate 304 that is moved past the sensor 302, which remains stationary. Alternatively, the relative movement between the substrate 304 and the sensor 302 could be achieved by holding the substrate 304 stationary and moving the sensor 302 over the substrate 304 in a single pass.

To perform the scan, the scanner uses a light source 306 to successively illuminate a portion of the substrate 304 currently passing over the sensor 302 in a particular color, e.g., red, green, blue, or infrared. The particular color to be used for generating OMR data can be encoded on the substrate 304, and read by the scanner apparatus as the substrate 304 is fed into the device prior to scanning. For example, the substrate 304 may be encoded with information that tells the scanner that the substrate 304 should be scanned in a manner corresponding to graphite-based user-made marks (e.g., pencil marks). In that case, the scanning operation involves successively illuminating a portion of the substrate 304 currently passing over the sensor 302 with each of four different colors of light, namely, red, green, blue, and infrared, in sequence. The reflected red, green, and blue light picked up by the sensor 302 is used to generate image data representing a visual appearance of the side of the substrate 304 being scanned. Assuming in this example that a pencil was used to mark the substrate, at the same time the infrared light is used to drop out all other colors, leaving only the graphite-based marks visible to the sensor 302, which picks up their presence and location and uses that information to generate OMR data.

Alternatively, the substrate 304 may be an answer form that is printed in a particular color, e.g., red, and bears encoding marks to inform any suitable scanner that will ultimately scan the form that the OMR scanning operation is to be performed using an analogous color of light, in this example, red light. Accordingly, after the form has been marked by the user (e.g., using a blue or black ink pen), and inserted into the scanner, the substrate 304 is moved past the sensor 302 while a portion of the substrate 304 currently passing over the sensor 302 is successively illuminated with each of three different colors of light, namely, red, green, and blue, in sequence. As above, the reflected red, green, and blue light picked up by the sensor 302 is used to generate image data representing a visual appearance of the side of the substrate 304 being scanned. In addition, because the substrate 304 is printed in red, illuminating the substrate with red light has the effect of causing the non-marked areas to "drop out" while making the marked areas visible to the sensor 302. In other words, the red light illumination is used to capture both OMR data and digital image data at the same time. Other combinations of using the same printing color and light color to achieve this same result are possible. In addition, a color model other than RGB (e.g., cyan, magenta, yellow) could be used for the scanning operation. Moreover, any suitable type of sensor may be used, for example, a contact image sensor (CIS) or a charge-coupled device (CCD), depending on the desired implementation. If a CIS is used, typically the substrate being scanned would be in contact with the sensor as it passes over while being scanned.

Because it may be desirable to have digital images of both sides of the form, a scanner apparatus may have a pair of opposing sensors between which the substrate being scanned is passed a single time. During that single pass, one sensor scans a first side of the substrate (e.g., the front) while, at the same time, the other sensor scans a second side of the substrate (e.g., the back). In this manner, a complete visual record of the substrate is captured at the same time as the OMR data for that form is captured.

After the scanning has been completed, a test results file corresponding to the scanned substrate 304 may be formed, e.g., by associating the digital image(s) of an answer form with the OMR test score results for that same form. The test results file can be transmitted to an external computer system and, for example, stored in a database for future reference. The data for a scanned form is fully processed and transmitted before the next form to be scanned is received for the scanning operation. In this manner, all parties concerned are assured that the digital image of each form accurately represents the form as it appeared at the time of OMR scanning.

Figure 4:
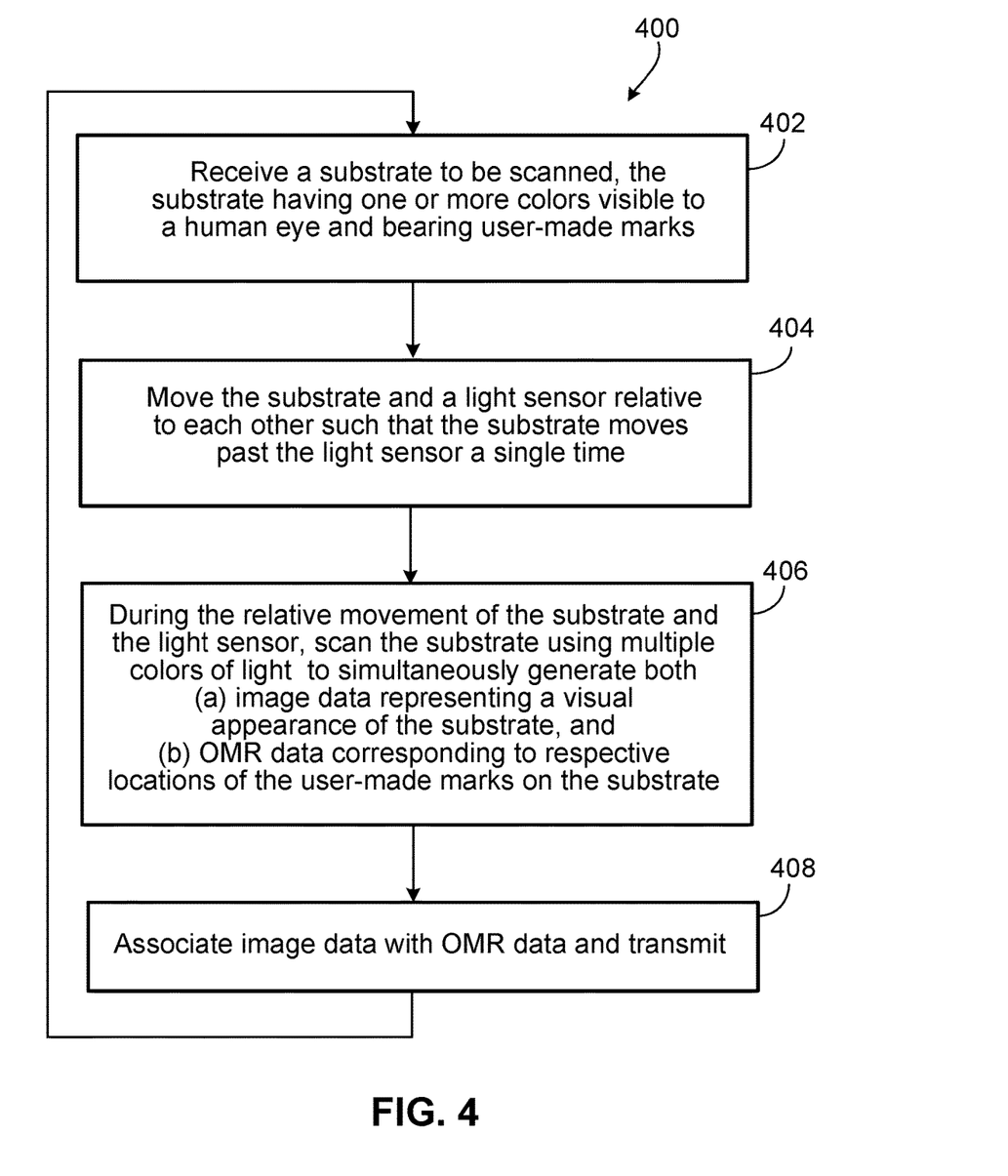
FIG. 4 is a flowchart of an exemplary for performing optical mark recognition (OMR) scanning.

FIG. 4 is a flowchart of a process 400 for performing OMR scanning of a substrate, e.g., a test answer form. At 402, the scanner receives a substrate to be scanned. The substrate has one or more colors visible to a human eye (e.g., red, blue, orange, green, black, or grey) and bears marks made by the test-taker. At 404, the scanner performs a single-pass scan of the substrate, e.g., by moving the substrate and a light sensor relative to each other such that the substrate moves past the light source a single time. To accomplish this relative movement, either the substrate can be passed over a stationary sensor, or a sensor may be passed over the substrate while it is being held stationary, e.g., between a glass platen and another surface that together hold the substrate in place.

At 406, during the relative movement of the substrate and the light sensor, the substrate is scanned using multiple colors of light (e.g., red, green, blue, and potentially also a fourth color, infrared) to simultaneously generate both (a) image data representing a visual appearance of the substrate, and (b) OMR data corresponding to respective locations of the user-made marks on the substrate. This is accomplished by illuminating each portion of the substrate passing over the sensor with the multiple colors of light, in sequence, and using a light sensor to capture the reflected light. Infrared light, is included in this sequence if the scanner has been set to detect graphite-based marks on the substrate. Otherwise, one of the three colors (e.g., red) is used both to generate image data and OMR data.

At 408, the image data for the scanned form is associated with the OMR data for that form, e.g., by creating a data file corresponding to the scanned form. That data file can then be transmitted to a remote computer system for storage and further processing. Typically, this transmission occurs before the scanning operation commences on the next form to be scanned. After that, the process 400 returns to 402 and repeats until no more forms remain to be scanned.

Figure 5:
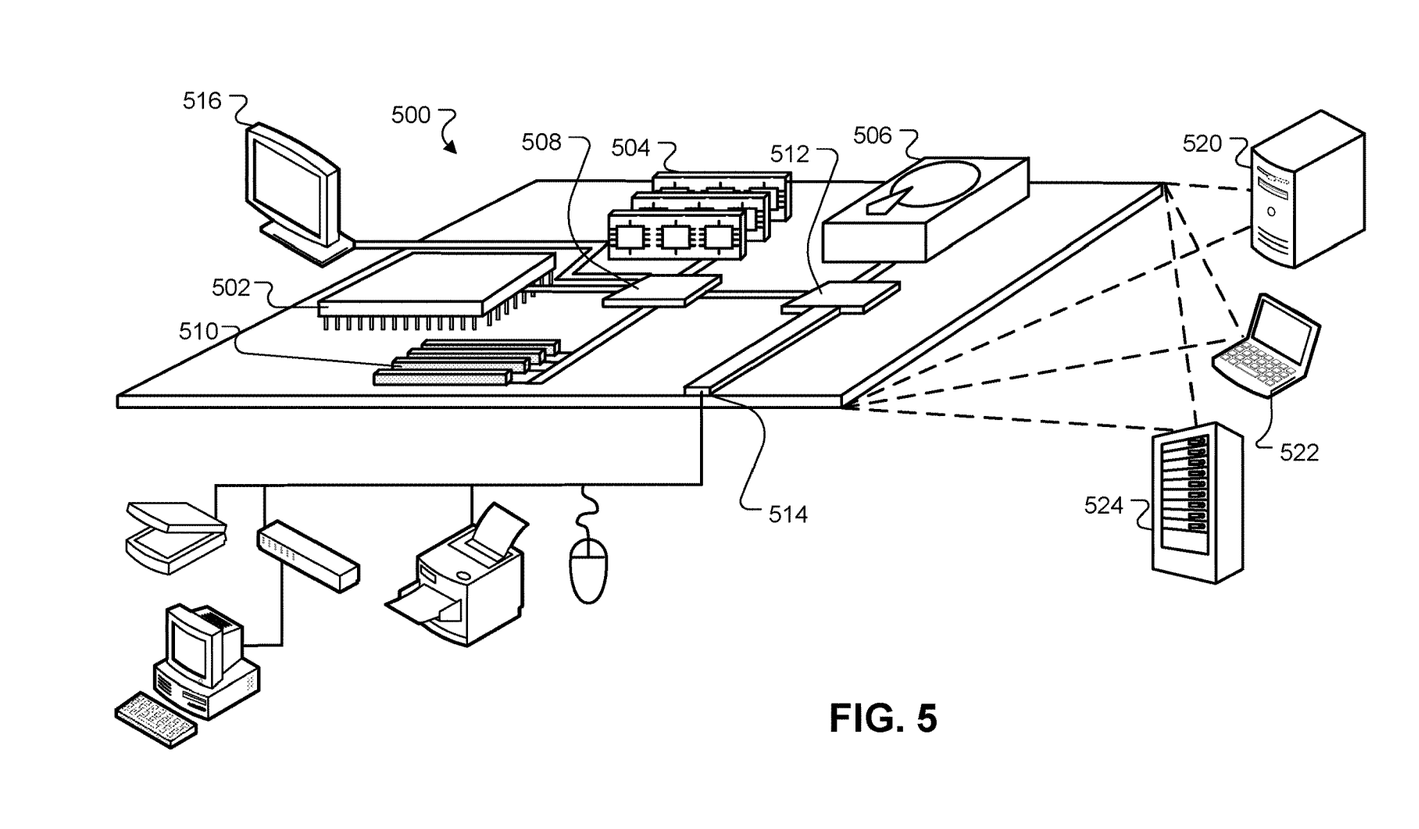
FIG. 5 is a block diagram of a computing device that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method of performing optical mark recognition (OMR) scanning, the method comprising:
    receiving a substrate to be scanned, the substrate having one or more colors visible to a human eye and bearing user-made marks;
    obtaining information encoded on the substrate that represents whether the substrate is to be scanned in a first mode using four colors of light or a second mode using three colors of light;
    determining whether the information encoded on the substrate indicates that the substrate is to be scanned in the first mode using four colors of light or the second mode using three colors of light; and
    based on a result of the determining, either:
    (i) scanning the substrate in the first mode using the four colors of light including both (A) infrared light and (B) three other colors of light, comprising
    moving the substrate and a light sensor relative to each other such that the substrate moves past the light sensor a single time, and
    during the relative movement of the substrate and the light sensor, successively illuminating, by the light source, the substrate using the four colors of light in sequence and reading, by the light sensor, light successively reflected off of the substrate for each of the four colors of light to generate both (a) multiple respective representations of image data for each of the three other colors of light, and (b) OMR data from the infrared light, the OMR data corresponding to respective locations of the user-made marks on the substrate; or
    (ii) scanning the substrate in the second mode using the three colors of light, comprising:
    moving the substrate and a light sensor relative to each other such that the substrate moves past the light sensor a single time, and
    during the relative movement of the substrate and the light sensor, successively illuminating, by the light source, the substrate using the three colors of light in sequence and reading, by the light sensor, light successively reflected off of the substrate for each of the three colors of light to generate both (a) multiple respective representations of image data for each of the three colors of light, and (b) OMR data from one of the three colors of light.

2. The method of claim 1, wherein a determination that the substrate is to be scanned in the first mode using the four colors of light, one of which is infrared light, represents a determination that the substrate is to be scanned in a manner corresponding to graphite-based user-made marks.

3. The method of claim 1, wherein a determination that the substrate is to be scanned in the second mode using the three colors of light, other than infrared light, represents a determination that the substrate is to be scanned in a manner corresponding to non-graphite-based user-made marks.

4. The method of claim 3, wherein the OMR data is generated based on red light, blue light, green light, cyan light, magenta light, or yellow light.

5. The method of claim 3, wherein one of the colors of light is used to generate both one of the representations of image data and OMR data.

6. The method of claim 1, wherein the three other colors of light include red, green, and blue.

7. The method of claim 1, further comprising transmitting the OMR data and one or more of the scanned representations of image data to a separate computer system before receiving a subsequent substrate to be scanned.

8. The method of claim 7, wherein transmitting the OMR data and the one or more scanned representations of image data comprises transmitting to a computer system that is external to a device that performs the scanning.

9. The method of claim 1, further comprising:
    simultaneously performing the scanning of both sides of the substrate using the light sensor for a first side of the substrate, and a second light sensor for a second side of the substrate; and
    generating a first set of OMR data and image data based on output of the light sensor for the first side of the substrate, and a second set of OMR data and image data based on output of the second light sensor.

10. The method of claim 1, wherein the one or more colors visible to a human eye include black or white or both.

11. The method of claim 1, further comprising associating the OMR data and one or more of the scanned representations of image data to form a test results file corresponding the scanned substrate.

12. The method of claim 1, wherein successively illuminating the substrate in the second mode comprises illuminating the substrate with red, green, and blue light in sequence.

13. The method of claim 1, wherein successively illuminating the substrate comprises in the first mode illuminating the substrate with red, green, blue, and infrared light in sequence.

14. The method of claim 1, wherein moving the substrate and the light sensor relative to each other comprises moving the substrate past a stationary light sensor.

15. The method of claim 1, wherein moving the substrate and the light sensor relative to each other comprises moving the light sensor past the substrate while the substrate is stationary.

16. A system for performing optical mark recognition (OMR) scanning, the system comprising:
one or more processors;
a non-transitory memory configured to store machine instructions to be executed by the one or more processors, wherein execution of the machine instructions causes the system to perform operations comprising:
receiving a substrate to be scanned, the substrate having one or more colors visible to a human eye and bearing user-made marks;
obtaining information encoded on the substrate that represents whether the substrate is to be scanned in a first mode using four colors of light or a second mode using three colors of light;
determining whether the information encoded on the substrate indicates that the substrate is to be scanned in the first mode using four colors of light or the second mode using three colors of light; and
based on a result of the determining, either:
(i) scanning the substrate in the first mode using the four colors of light including both (A) infrared light and (B) three other colors of light, comprising:
moving the substrate and a light sensor relative to each other such that the substrate moves past the light sensor a single time, and
during the relative movement of the substrate and the light sensor, successively illuminating, by the light source, the substrate using the four colors of light in sequence and reading, by the light sensor, light successively reflected off of the substrate for each of the four colors of light to generate both (a) multiple respective representations of image data for each of the three other colors of light, and (b) OMR data from the infrared light, the OMR data corresponding to respective locations of the user made marks on the substrate; or
(ii) scanning the substrate in the second mode using the three colors of light, comprising:
moving the substrate and a light sensor relative to each other such that the substrate moves past the light sensor a single time, and
during the relative movement of the substrate and the light sensor, successively illuminating, by the light source, the substrate using the three colors of light in sequence and reading, by the light sensor, light successively reflected off of the substrate for each of the three colors of light to generate both (a) multiple respective representations of image data for each of the three colors of light, and (b) OMR data from one of the three colors of light.

17. The system of claim 16, wherein a determination that the substrate is to be scanned in the first mode using the four colors of light, one of which is infrared light, represents a determination that the substrate is to be scanned in a manner corresponding to graphite-based user-made marks.

18. The system of claim 16, wherein a determination that the substrate is to be scanned in the second mode using the three colors of light, other than infrared light, represents a determination that the substrate is to be scanned in a manner corresponding to non-graphite-based user-made marks.

19. The system of claim 18, wherein the OMR data is generated based on red light, blue light, green light, cyan light, magenta light, or yellow light.

20. The system of claim 18, wherein the one of the colors of light is used to generate both one of the representations of image data and OMR data.

21. The system of claim 16, wherein the three other colors of light include red, green, and blue.

22. The system of claim 16, wherein the operations further comprise transmitting the OMR data and one or more of the scanned representations of image data to a separate computer system before receiving a subsequent substrate to be scanned.

23. The system of claim 22, wherein transmitting the OMR data and the one or more scanned representations of image data comprises transmitting to a computer system that is external to a device that performs the scanning.

24. The system of claim 16, wherein the operations further comprise:
simultaneously performing the scanning of both sides of the substrate using the light sensor for a first side of the substrate, and a second light sensor for a second side of the substrate; and
generating a first set of OMR data and image data based on output of the light sensor for the first side of the substrate, and a second set of OMR data and image data based on output of the second light sensor.

25. The system of claim 16, wherein the one or more colors visible to a human eye comprise black or white or both.

26. The system of claim 16, wherein the operations further comprise associating the OMR data and one or more of the scanned representations of image data to form a test results file corresponding the scanned substrate.

27. The system of claim 16, wherein successively illuminating the substrate in the second mode comprises illuminating the substrate with red, green, and blue light in sequence.

28. The system of claim 16, wherein successively illuminating the substrate in the first mode comprises illuminating the substrate with red, green, blue, and infrared light in sequence.

29. The system of claim 16, wherein moving the substrate and the light sensor relative to each other comprises moving the substrate past a stationary light sensor.

30. The system of claim 16, wherein moving the substrate and the light sensor relative to each other comprises moving the light sensor past the substrate while the substrate is stationary.

31. One or more non-transitory computer-readable storage media storing instructions that, when executed by one or more processors of an optical mark recognition (OMR) system, cause the OMR system to perform operations comprising:
receiving a substrate to be scanned, the substrate having one or more colors visible to a human eye and bearing user-made marks;
obtaining information encoded on the substrate that represents whether the substrate is to be scanned in a first mode using four colors of light or a second mode using three colors of light;
determining whether the information encoded on the substrate indicates that the substrate is to be scanned in the first mode using four colors of light or the second mode using three colors of light; and
based on a result of the determining, either:

(i) scanning the substrate in the first mode using the four colors of light including both (A) infrared light and (B) three other colors of light, comprising:

moving the substrate and a light sensor relative to each other such that the substrate moves past the light sensor a single time, and during the relative movement of the substrate and the light sensor, successively illuminating, by the light source, the substrate using the four colors of light in sequence and reading, by the light sensor, light successively reflected off of the substrate for each of the four colors of light to generate both (a) multiple respective representations of image data for each of the three other colors of light, and (b) OMR data from the infrared light, the OMR data corresponding to respective locations of the user-made marks on the substrate; or (ii) scanning the substrate in the second mode using the three colors of light, comprising:

moving the substrate and a light sensor relative to each other such that the substrate moves past the light sensor a single time, and during the relative movement of the substrate and the light sensor, successively illuminating, by the light source, the substrate using the three colors of light in sequence and reading, by the light sensor, light successively reflected off of the substrate for each of the three colors of light to generate both (a) multiple respective representations of image data for each of the three colors of light, and (b) OMR data from one of the three colors of light.

* * * * *